Patented Apr. 27, 1926.

1,582,776

UNITED STATES PATENT OFFICE.

CARL OECHSLIN, OF ABLON, FRANCE, ASSIGNOR TO ETABLISSEMENTS POULENC FRÈRES, OF PARIS, FRANCE.

PROCESS FOR THE PREPARATION OF SUBSTITUTED ALIPHATIC ARSONIC ACIDS.

No Drawing.   Application filed October 25, 1923.   Serial No. 670,797.

*To all whom it may concern:*

Be it known that I, CARL OECHSLIN, a citizen of the Swiss Confederation, residing at Ablon, Republic of France, have invented certain new and useful Improvements in Processes for the Preparation of Substituted Aliphatic Arsonic Acids, of which the following is a specification.

This invention relates to a process for the preparation of substituted aliphatic arsonic acids.

According to Meyer's reaction, methyl arsonic acid may be prepared by causing sodium arsenite in aqueous or alcoholic solution to act upon methyl iodide or bromide.

I have discovered that it is possible, by extension of this method, to prepare substituted aliphatic arsonic acids from compounds of the type $R—CHX—R_1$, where X is an atom of halogen, R any other monovalent substituent, and $R_1$ any other monovalent substituent except hydrogen.

The general reaction which takes place may be represented by the following equations:—

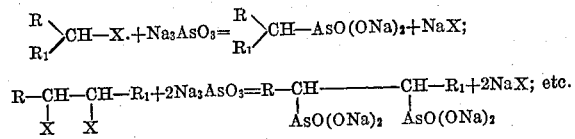

or, $$R—CH—CH—R_1 + 2Na_3AsO_3 = R—CH\text{———}CH—R_1 + 2NaX;\text{ etc.}$$
$$\phantom{R—C}X\phantom{H—C}X\phantom{—R_1 + 2Na_3AsO_3 = R—C}AsO(ONa)_2\ AsO(ONa)_2$$

The general procedure consists in treating the halogen compound with a solution of sodium arsenite, usually with warming, and occasionally completing the reaction on the steam bath, removing the sodium halide formed and the arsenite remaining uncombined, and precipitating the substituted aliphatic arsonic acid sought in the form of its barium salt.

Reasonable variations in the proportions of the reacting substances, in the temperature of the reaction, and the duration of heating period, are possible without materially altering the course of the reaction.

*Example I.*—To 20 grams of arsenious acid dissolved in 60 cc. of 33% sodium hydroxide solution, and heated almost to boiling, is added, with constant stirring, 37 grams of ethylene bromide. The mixture is refluxed for some time to complete the reaction, which may be represented as follows:—

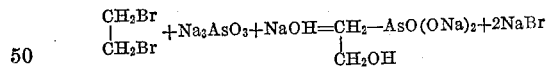

The sodium bromide formed is removed, the solution is neutralized with hydrochloric acid, treated with hydrogen peroxide, and the uncombined arsenious acid precipitated with magnesia mixture. Barium chloride solution is then added to precipitate the barium salt, from which the free oxyethylarsonic acid may be obtained by treatment with sulphuric acid.

*Example II.*—To 20 grams of arsenious acid dissolved in 60 grams of 33% sodium hydroxide solution is added, with stirring, 40 grams of $a,\beta$-dibromo-propanol ($CH_2Br—CH_2Br—CH_2OH$). By proceeding as indicated in the preceding example, an acid having the following composition is obtained:—

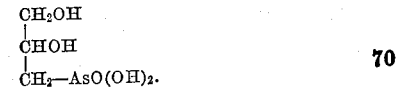

In this reaction there is also obtained the di-substituted acid, by replacement of both atoms of halogen with arsonic acid groups; thus,

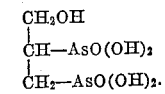

I claim:—

1. The method of preparing substituted aliphatic arsonic acids which consists in treating aliphatic compounds of the type $R—CHX—R_1$ (R being any monovalent substituent, X an atom of halogen, and $R_1$ any monovalent substituent excepting hydrogen) with an alkali metal arsenite substantially as hereinbefore described.

2. The method of preparing substituted aliphatic arsonic acids which comprises treating aliphatic compounds of the type R—CH Br—R₁ (R being any monovalent substituent and R₁ any monovalent substituent except hydrogen) with an alkali metal arsenite substantially as described.

3. The method of preparing substituted aliphatic arsonic acids which comprises treating aliphatic halides containing two monovalent substituents, one of which may be any monovalent substituent and the other of which may be any monovalent substituent except hydrogen with alkali metal arsenite substantially as described.

CARL OECHSLIN.